US012586475B2

(12) United States Patent
Essoussi et al.

(10) Patent No.: US 12,586,475 B2
(45) Date of Patent: Mar. 24, 2026

(54) METHOD AND AVIONICS COMPUTER FOR ADAPTING AN ANCHOR POINT OF A TERMINAL SEGMENT WITH RESPECT TO A LANDING THRESHOLD POINT, FOR A NON-PRECISION APPROACH

(71) Applicants: Airbus SAS, Blagnac (FR); Airbus Operations SAS, Toulouse (FR)

(72) Inventors: Mohamed-Habib Essoussi, Toulouse (FR); Didier Fourcade, Blagnac (FR); Olivier Falipou, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 216 days.

(21) Appl. No.: 18/501,361

(22) Filed: Nov. 3, 2023

(65) Prior Publication Data

US 2024/0169849 A1 May 23, 2024

(30) Foreign Application Priority Data

Nov. 17, 2022 (FR) ....................................... 2211937

(51) Int. Cl.
*G08G 5/21* (2025.01)
*G08G 5/54* (2025.01)
*G08G 5/74* (2025.01)
*G08G 5/80* (2025.01)

(52) U.S. Cl.
CPC ................. *G08G 5/54* (2025.01); *G08G 5/21* (2025.01); *G08G 5/74* (2025.01); *G08G 5/80* (2025.01)

(58) Field of Classification Search
None
See application file for complete search history.

(56) References Cited

U.S. PATENT DOCUMENTS

2004/0183698 A1 9/2004 Rouquette et al.
2011/0035082 A1 2/2011 Loots et al.
(Continued)

FOREIGN PATENT DOCUMENTS

CN 112883541 A 6/2021
CN 112880679 B 8/2022

OTHER PUBLICATIONS

French Search Report for corresponding French Patent Application No. 2211937 dated May 31, 2023; priority document.

*Primary Examiner* — James M McPherson
(74) *Attorney, Agent, or Firm* — Greer Burns & Crain Ltd.

(57) ABSTRACT

The avionics computer comprises a processing unit configured to compare the distance between a first position and a second position with a predetermined distance, the first position corresponding to the position of an initial anchor point of an initial terminal segment and the second position corresponding to the position of a landing threshold point of the runway, to check whether the initial terminal segment of the virtual path crosses the threshold of the runway and, if the distance between the first position and the second position is less than the predetermined distance and if the initial terminal segment of the virtual path crosses the threshold of the runway, to define the landing threshold point as an anchor point of a terminal segment of a virtual path for a non-precision FLS approach mode, the avionics computer thus making it possible to increase availability to implement FLS mode.

12 Claims, 4 Drawing Sheets

(56) References Cited

U.S. PATENT DOCUMENTS

| | | | | |
|---|---|---|---|---|
| 2015/0203214 | A1* | 7/2015 | Bourret ................ | G01C 23/005<br>701/4 |
| 2017/0116866 | A1* | 4/2017 | Jeong ...................... | G01S 19/15 |
| 2017/0162067 | A1 | 6/2017 | Rouquette et al. | |

* cited by examiner

METHOD AND AVIONICS COMPUTER FOR ADAPTING AN ANCHOR POINT OF A TERMINAL SEGMENT WITH RESPECT TO A LANDING THRESHOLD POINT, FOR A NON-PRECISION APPROACH

CROSS-REFERENCES TO RELATED APPLICATIONS

This application claims the benefit of the French patent application No. 2211937 filed on Nov. 17, 2022, the entire disclosures of which are incorporated herein by way of reference.

FIELD OF THE INVENTION

The present invention relates to a method and avionics computer for adapting an anchor point of a terminal segment of a virtual path for a non-precision FLS approach mode of an aircraft, with a view to landing the aircraft on a runway of an aerodrome, and to a procedure and set of systems for implementing such a non-precision approach mode, comprising such a method and such a device, respectively.

BACKGROUND OF THE INVENTION

In the context of the present invention, a "non-precision approach" is understood to mean an approach that is not a precision instrument approach such as, for example, an ILS approach (ILS standing for Instrument Landing System), which uses, in particular, runway-edge ground stations and a dedicated radio receiver installed on board the aircraft.

An approach is a non-precision approach, such as considered in the present invention, when the above equipment is not available or in operation, at least in part, so that a conventional precision approach cannot be implemented. The present invention applies to a non-precision FLS approach (FLS standing for FMS Landing System and FMS standing for Flight Management System).

To implement this approach, using a non-precision FLS approach mode (or FLS mode), it is necessary to determine a virtual path, corresponding to the theoretical path that the aircraft must follow during this approach. Guiding the aircraft then consists in attempting to cancel out any discrepancies between the actual position of the aircraft and the position it would have if it were on this virtual path. Conventionally, the virtual path comprises a terminal segment, namely the last segment before reaching the runway. This terminal segment is defined with respect to a downstream end point called an anchor point.

Implementing FLS mode provides important assistance to the pilot of the aircraft, in particular by carrying out various guidance, monitoring and, if necessary, warning operations.

However, in order for this FLS mode to be able to be implemented as far as a touchdown zone on the runway, the anchor point must be positioned appropriately, in particular with respect to the runway threshold. Indeed, in the absence of such appropriate positioning, FLS mode cannot be implemented as far as the touchdown zone and implementation thereof is stopped at a certain distance from the runway.

Now, depending on its determination, the anchor point is not always positioned as needed to implement an FLS mode.

This usual system for implementing a non-precision FLS approach mode may therefore be further improved, in particular in terms of availability.

SUMMARY OF THE INVENTION

One objective of the present invention is to improve the implementation of a non-precision FLS approach mode of an aircraft. To this end, it relates to a method for adapting an anchor point of a terminal segment of a virtual path for a non-precision FLS approach mode (or FLS mode) of an aircraft, with a view to landing the aircraft on a runway of an aerodrome, the method being implemented in an avionics computer, in particular, a flight management system (FMS) (or computer), comprising at least a processing unit and a navigation database.

According to the invention, the method comprises at least the following steps, implemented by the processing unit:

- a comparison step, comprising comparing the distance between a first position and a second position with a predetermined distance, the first position corresponding to the position of an initial anchor point of an initial terminal segment and the second position corresponding to the position of a landing threshold point of the runway;
- a checking step, comprising checking whether the direction of the terminal segment of the virtual path crosses the threshold of the runway; and
- a computing step, comprising, if the distance between the first position and the second position is less than the predetermined distance and if the initial terminal segment of the virtual path crosses the threshold of the runway, defining the landing threshold point as an anchor point.

Thus, by virtue of the invention, when the abovementioned conditions are met, an appropriate anchor point that is located on the threshold of the runway is defined. By virtue of this new positioning of the anchor point, it is possible to implement an FLS mode until landing (that is to say, as far as a touchdown zone of the runway) and therefore benefit from the advantages (guidance, monitoring, warning), specified below, of FLS mode, which could not have been implemented without this adaptation.

It will be noted that this adaptation, that is to say, this displacement of the anchor point, slightly offsets the anchor point laterally by at most around ten meters with respect to the position of the initial anchor point, this being negligible in terms of implementation authorization and safety.

In one preferred embodiment, the predetermined distance is of the order of 0.14 nautical miles (around 260 meters).

The present invention also relates to a procedure for implementing a non-precision FLS approach mode of an aircraft, with a view to landing the aircraft on a runway of an aerodrome, the procedure using a virtual path a terminal segment of which is defined with respect to an anchor point, the procedure being implemented by a set of avionics systems.

According to the invention, the procedure comprises at least a method for adapting an anchor point as described above and uses the anchor point determined by the avionics computer as anchor point of the terminal segment of the virtual path.

Advantageously, the procedure, during the landing of the aircraft, guides the aircraft at least along the terminal segment of the virtual path, as far as a touchdown zone on the runway.

In addition, advantageously, the procedure, during the landing of the aircraft, monitors the aircraft as far as a touchdown zone on the runway, so as to detect, where applicable, at least one (vertical and/or horizontal) deviation of the current position of the aircraft with respect to the terminal segment of the virtual path.

Furthermore, advantageously, the procedure, in the event of detection of a (vertical and/or horizontal) deviation greater than a predetermined value, emits at least one of the following warnings in the cockpit of the aircraft: a visual warning, an acoustic warning.

The present invention furthermore relates to an avionics computer, in particular to a flight management system (or computer), for adapting an anchor point of a terminal segment of a virtual path for a non-precision FLS approach mode of an aircraft, with a view to landing the aircraft on a runway of an aerodrome, the avionics computer comprising at least a processing unit and a navigation database.

According to the invention, the processing unit is configured:

- to compare the distance between a first position and a second position with a predetermined distance, the first position corresponding to the position of an initial anchor point of an initial terminal segment and the second position corresponding to the position of a threshold point of the runway;
- to check whether the terminal segment of the virtual path crosses the threshold of the runway; and,
- if the distance between the first position and the second position is less than the predetermined distance and if the initial terminal segment of the virtual path crosses the threshold of the runway, to define the runway threshold point as an anchor point.

The present invention also relates to a set of avionics systems for implementing a non-precision FLS approach mode of an aircraft, with a view to landing the aircraft on a runway of an aerodrome, the set comprising at least one flight management system configured to use a final virtual path a terminal segment of which is defined with respect to an anchor point.

According to the invention, the set (of systems) comprises at least one avionics computer for adapting an anchor point as described above, and the set (of systems) is configured to use the anchor point defined by the avionics computer as an anchor point of the terminal segment of the virtual path.

In a preferred embodiment, the set additionally comprises at least one of the following systems: a flight warning system, a flight guidance system, a terrain avoidance and warning system, and is configured to implement at least one of the following actions during the landing of the aircraft:

- guiding the aircraft at least along the terminal segment of the virtual path, as far as a touchdown zone on the runway;
- monitoring the aircraft as far as the touchdown zone on the runway, so as to detect, where applicable, a (vertical and/or horizontal) deviation of the current position of the aircraft with respect to the terminal segment of the virtual path;
- in the event of detection of a (vertical and/or horizontal) deviation greater than a predetermined value, emitting at least one of the following warnings in the cockpit of the aircraft: a visual warning, an acoustic warning.

Moreover, the present invention also relates to an aircraft, in particular a cargo aircraft, which comprises at least an avionics computer and/or at least a set of systems, such as those described above.

BRIEF DESCRIPTION OF THE DRAWINGS

The appended figures will make it easy to understand how the invention may be implemented. In these figures, identical references denote similar elements.

DETAILED DESCRIPTION OF THE PREFERRED EMBODIMENTS

The avionics computer 1, shown schematically in FIG. 1 and allowing the invention to be illustrated, is intended to adapt an anchor point of a terminal segment of a virtual path, as specified below.

In one preferred embodiment, this avionics computer 1 corresponds to a flight management system (FMS) (or computer) of an aircraft AC, for example of a cargo aircraft.

In one preferred application, this avionics computer 1 forms part of a set 2 of systems that is intended to implement a non-precision FLS approach mode (referred to as an "FLS mode" below) of the aircraft AC.

Figure 2:
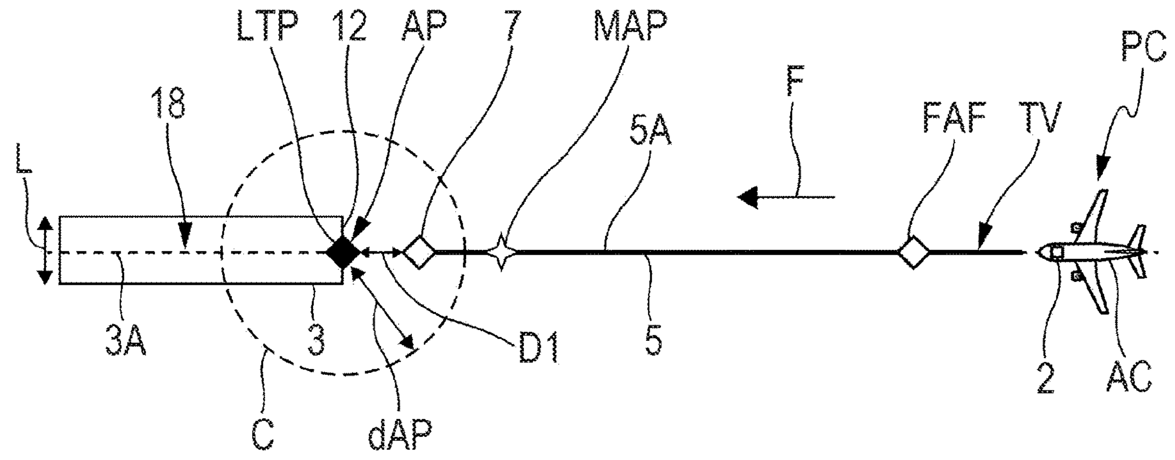
FIG. 2 is a schematic view, in a horizontal plane, of an adaptation of an anchor point of a terminal segment of a virtual path that is aligned with the axis of the runway.
Figure 3:
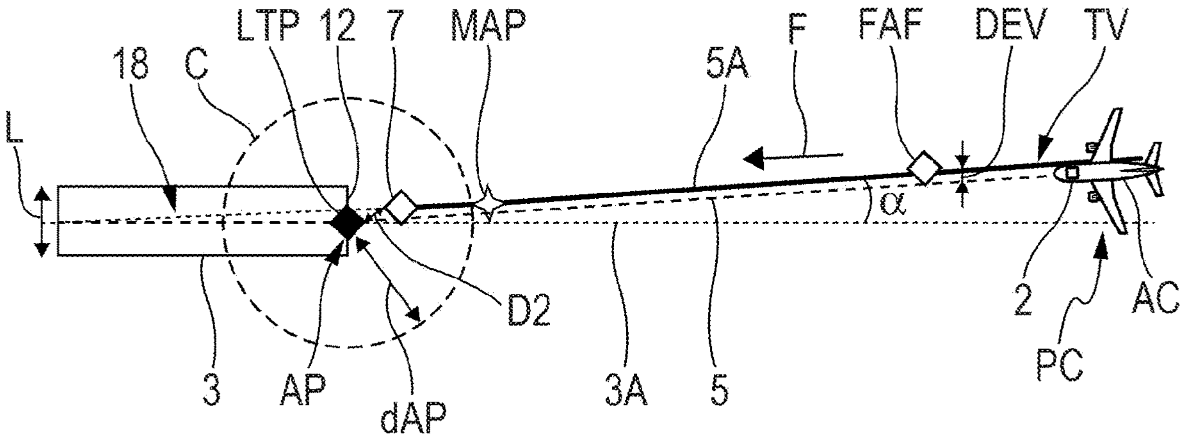
FIG. 3 is a schematic view, in a horizontal plane, of an adaptation of an anchor point of a terminal segment of a virtual path that is offset laterally with respect to the axis of the runway.
Figure 5:
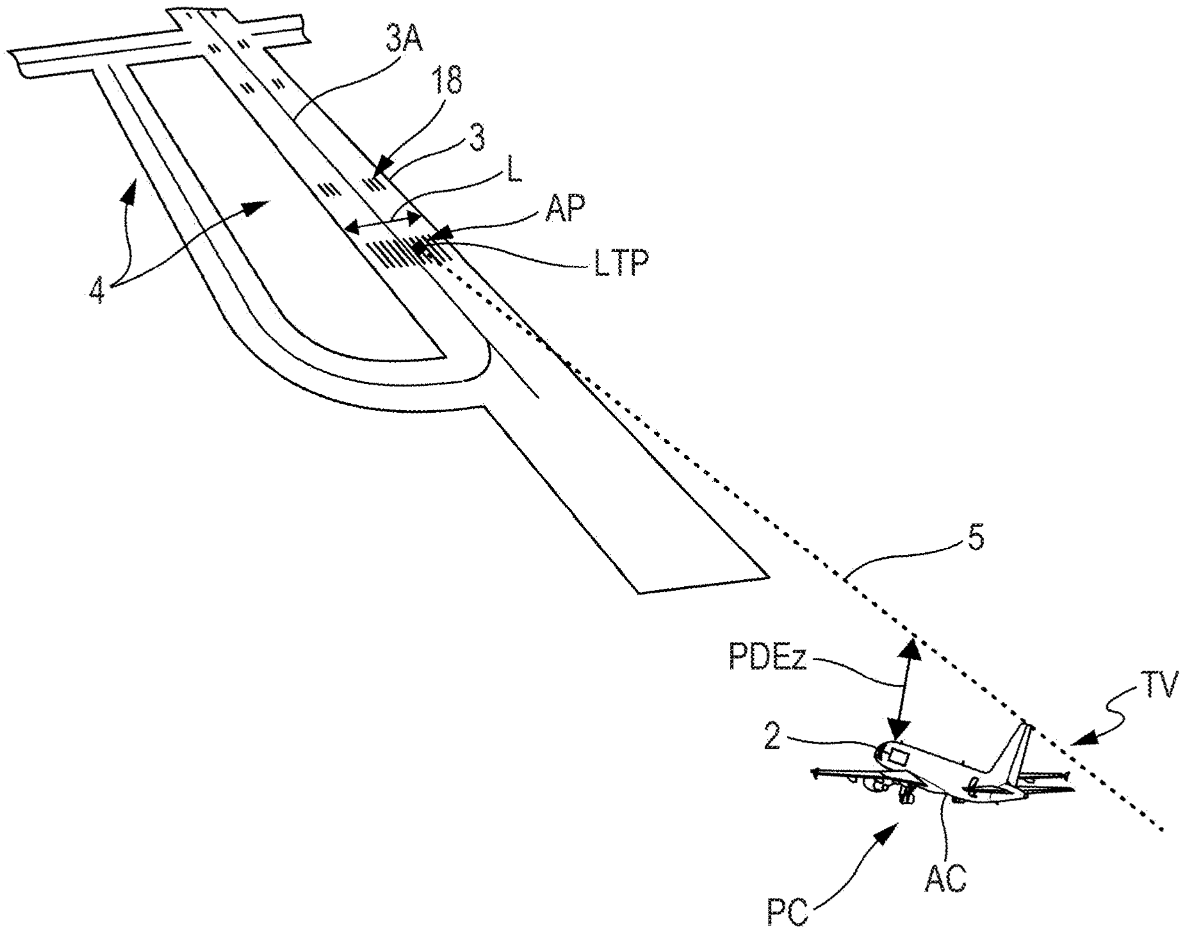
FIG. 5 is a schematic perspective view of a terminal segment of a virtual path followed by an aircraft during an approach, with a view to landing the aircraft on a runway.

In the examples of FIGS. 2, 3 and 5, the aircraft AC equipped with the set 2 (of systems) is in a phase of approaching a runway 3 of an aerodrome 4, with a view to landing on this runway 3.

The set 2, as is conventional and as explained in more detail below, allows a (final) virtual path TV to be determined and the aircraft AC to be made to follow it to implement an FLS mode, with a view to landing the aircraft AC on the runway 3. As also explained below, the set 2 determines the (possible) lateral and vertical deviations of the current position PC of the aircraft AC with respect to this virtual path TV (or virtual approach axis), and the aircraft AC is then piloted so as to cancel out these deviations.

The set 2 (which is located on board the aircraft AC, as shown highly schematically in FIGS. 2, 3 and 5) is therefore intended to assist the pilot of the aircraft AC, in particular with implementing FLS mode along the virtual path TV.

This virtual path TV comprises a terminal segment 5. This terminal segment 5 corresponds to a straight-line segment that, in the direction (illustrated by an arrow F) of flight of the aircraft AC during the approach, starts at a fix FAF (FAF standing for final approach fix), that is to say, an upstream point or fix representing the place where final approach begins, and it has a particular slope, generally of the order of 3°. In the following description, the terms "upstream" and "downstream" are defined with respect to the direction of flight of the aircraft AC, indicated by the arrow F in FIGS. 3 to 5.

The terminal segment 5 ends at a downstream point representing an anchor point AP.

The purpose of the avionics computer 1 is to adapt, in certain conditions, the anchor point AP of the terminal segment 5 and to provide it to the set 2 so that it uses it to implement FLS mode.

Figure 1:
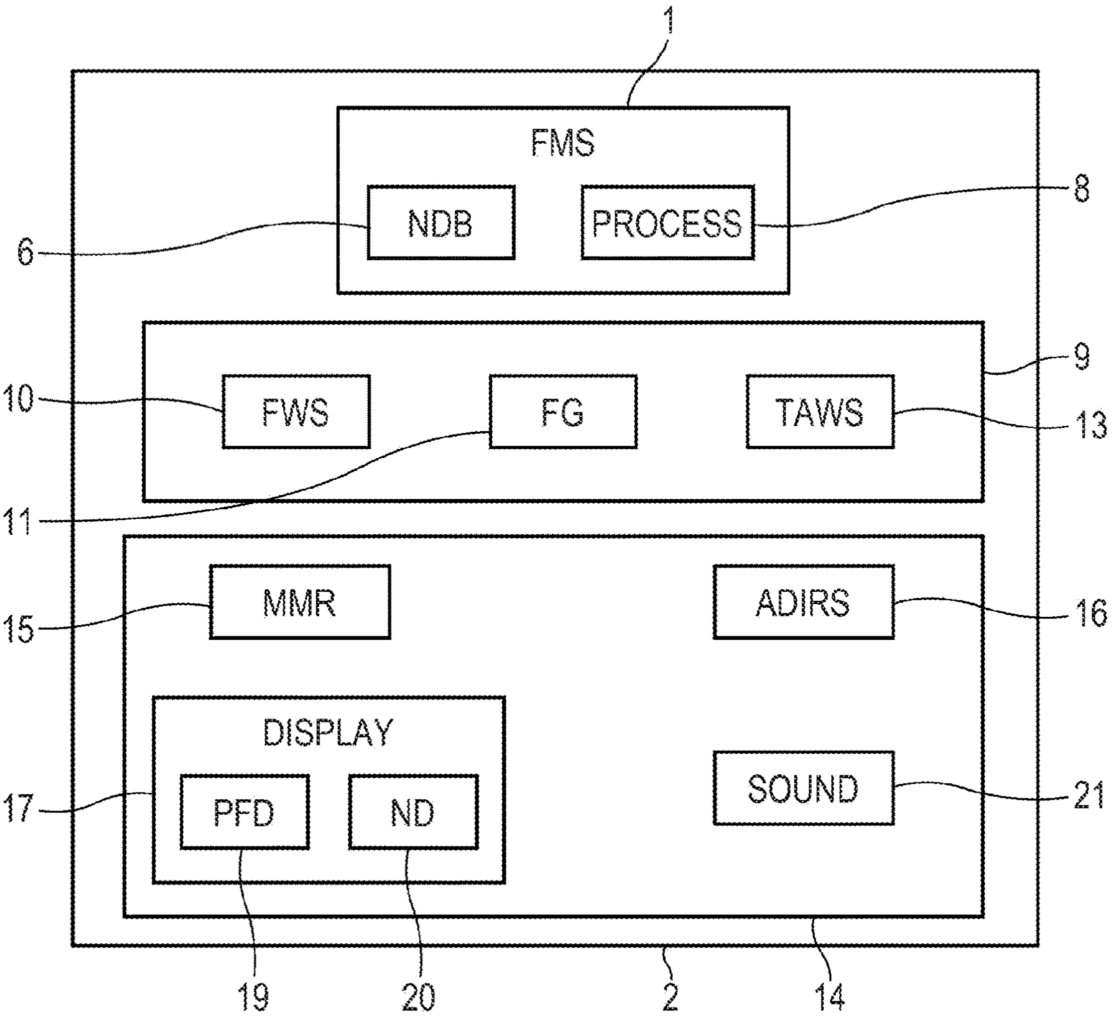
FIG. 1 is the block diagram of one particular embodiment of a system for implementing an FLS mode comprising an avionics computer for adapting an anchor point of a terminal segment of a virtual path.

To this end, the avionics computer 1 comprises at least, as shown in FIG. 1:

- a navigation database (NDB) 6; and
- a processing unit (PROCESS) 8 configured in particular to receive data from the navigation database 6, and to carry out processing operations based on these data.

More specifically, the processing unit 8 is configured:

- to compute the distance D1, D2 (FIGS. 2 and 3) between the position of an initial anchor point 7 (of a terminal segment called initial terminal segment 5A, defined between this initial anchor point 7 and the fix FAF) and the position of a landing threshold point LTP (or LTP point) of the runway 3, and to compare this distance D1, D2 with a predetermined distance dAP;
- to check whether the initial terminal segment 5A crosses the threshold 12 of the runway 3; and
- if the distance D1, D2 is less than the distance dAP and if the terminal segment 5A crosses the threshold 12 of the runway 3, to define the LTP point as an anchor point AP.

To implement FLS mode, the set 2 comprises, in addition to the avionics computer 1, a plurality of conventional systems grouped together into a subset 9 in FIG. 1. The subset 9 comprises the following conventional systems:

- a flight warning system (FWS) 10, making it possible, in particular, to determine excessive deviations and to highlight them on at least one screen;
- a flight guidance (FG) system 11; and
- a terrain avoidance and warning system (TAWS) 13.

Figure 6:
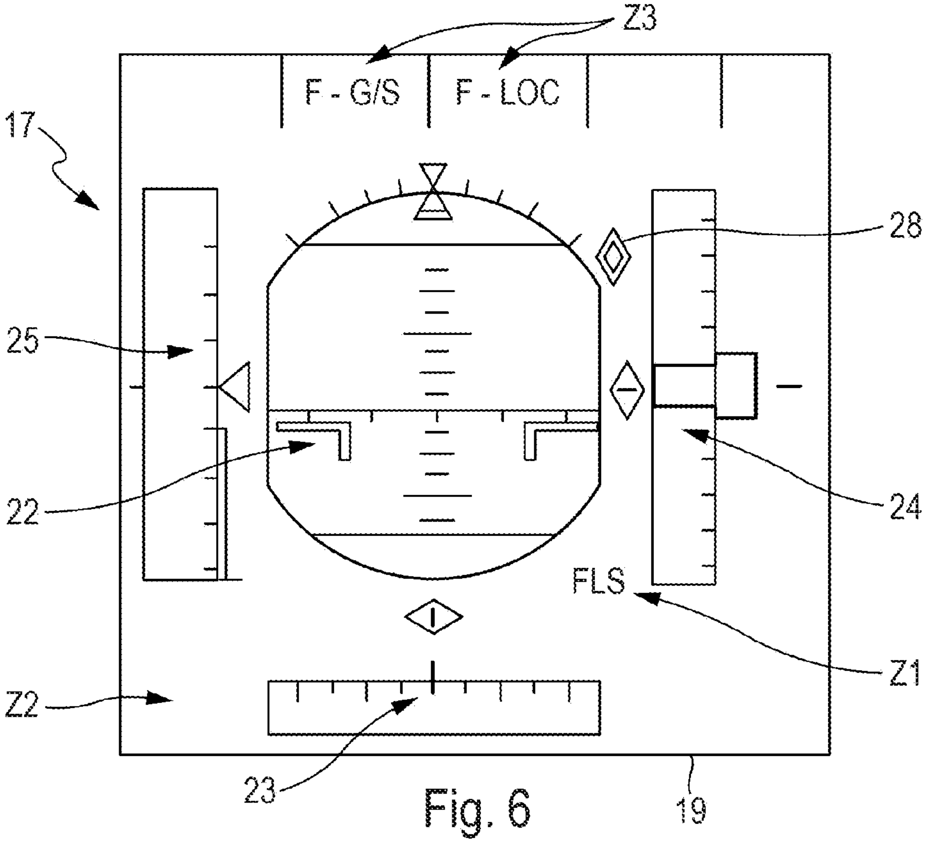
FIG. 6 schematically illustrates a display, in particular a vertical display, relating to the situation of FIG. 5.
Figure 7:
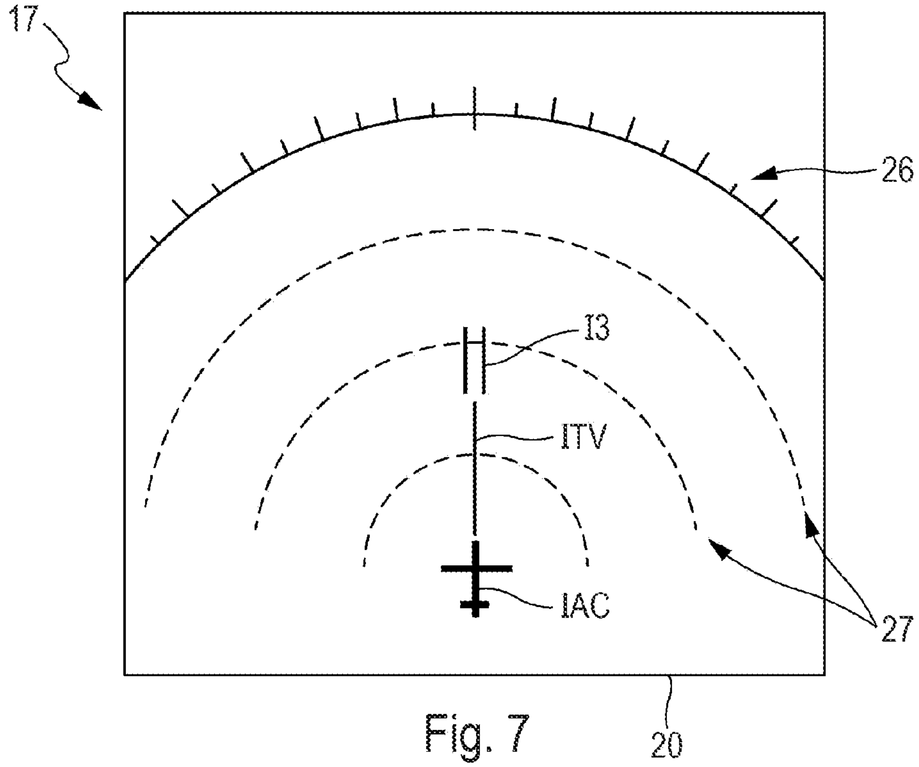
FIG. 7 schematically illustrates a horizontal display relating to the situation of FIG. 5.

To implement FLS mode, the set 2 may also additionally use other conventional systems or means grouped together into a subset 14 in FIG. 1. The subset 14 comprises the following systems:

- a landing assistance multimode receiver (MMR) 15;
- an air data and inertial reference system (ADIRS) 16;
- a display system (DISPLAY) 17, comprising, in particular, a primary flight parameter screen (PFD, primary flight display) 19, as shown, for example, in FIG. 6, and a navigation screen (ND, navigation display) 20, as shown, for example, in FIG. 7; and
- an acoustic warning system (SOUND for sound alarm unit) 20, comprising, for example, at least one loudspeaker that is installed in the cockpit of the aircraft or in equipment of the cockpit and that makes it possible to emit an acoustic alarm.

In one preferred embodiment, and as described in more detail below, the set 2 (of systems) is configured, during the landing of the aircraft AC, to implement the following actions:

- guiding the aircraft AC at least along the terminal segment 5 of the virtual path TV, as far as a touchdown zone 18 on the runway 3. To this end, the display system 17 may provide information to the pilot in order to help them to guide the aircraft AC as far as landing it on the runway 3;
- monitoring the aircraft AC as far as the touchdown zone 18 on the runway 3, so as to detect, where applicable, a (vertical and/or horizontal) deviation of the current position PC of the aircraft AC with respect to the initial terminal segment 5A of the virtual path TV; and
- in the event of detection of a vertical deviation greater than a predetermined value, emitting at least one warning (or alarm) in the cockpit of the aircraft, namely at least one visual warning (for example on the primary flight parameter screen 19) and/or at least one acoustic warning (in particular, using the acoustic warning system 21).

Figure 4:
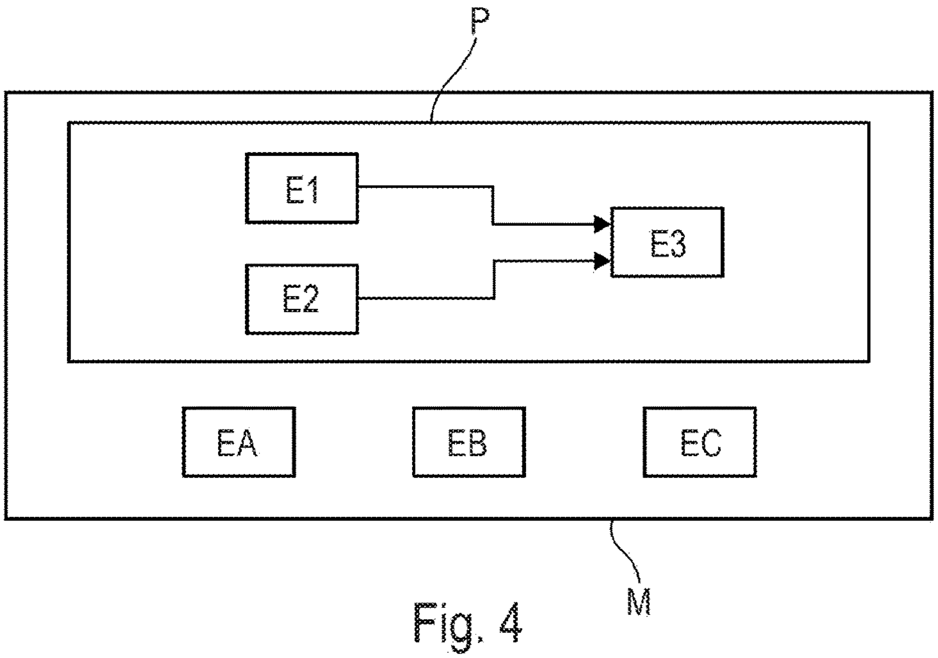
FIG. 4 is the block diagram of one particular embodiment of a procedure for implementing an FLS mode comprising a method for adapting an anchor point of a terminal segment of a virtual path.

The avionics computer 1, as described above, is intended to implement a method P (shown in FIG. 2) for adapting an anchor point AP of a terminal segment 5 of a virtual path TV for an FLS mode of an aircraft AC, with a view to landing the aircraft AC on a runway 3 of an aerodrome 4, as illustrated in FIGS. 3 to 5. The terminal segment 5 starts at the final approach fix FAF and ends at the anchor point AP.

In terms of its implementation, the method P forms part of a procedure M (FIG. 2) for implementing, using the set 2 as described above, an FLS mode that uses the anchor point AP defined by the method P as an anchor point of the terminal segment 5 of the virtual path TV when implementing FLS mode.

As shown in FIG. 4, the method P comprises, in particular, a comparison step E1, a checking step E2 and a computing step E3.

The method P takes into account the position (that is to say, the latitude, the longitude, and the altitude) of the initial anchor point 7.

The initial anchor point 7 (which represents the anchor point considered by the set 2 before the adaptation implemented by the avionics computer 1) may correspond to the MAP point (explained below) or else to a point determined by a conventional computing means (in particular, the avionics computer 1) of the set 2. This initial anchor point 7 then represents a "pseudo-FEP", that is to say, a point having the characteristics of a final end point (FEP) but that has not been coded as an FEP point, but determined by a computing means of the set 2.

The method P also takes into account the position (that is to say, the latitude, the longitude, and the altitude) of the landing threshold point LTP (hereinafter LTP point) of the runway 3. The LTP (landing threshold point), which is recorded in the navigation database 6, is a point located laterally at the intersection between the threshold 12 (that is to say, the upstream edge of the runway 3, which is orthogonal to the axis 3A of the runway 3 and has a length equal to the width L of the runway 3) of the runway 3 and the axis 3A of the runway 3, and vertically at a runway threshold height TCH (threshold crossing height). This height TCH is either coded in the navigation database 6 or recorded in a memory of the avionics computer 1, and is generally equal to 50 feet (around 15 meters) in this case.

The comparison step E1, implemented by the processing unit 8, comprises:

- computing the distance D1, D2 between the position of the initial anchor point 7 and the position of the LTP point; and
- comparing this distance D1, D2 with a predetermined distance dAP.

In one preferred embodiment, the predetermined distance dAP is of the order of 0.14 nautical miles (around 260 meters).

Furthermore, the checking step E2, also implemented by the processing unit 8, comprises checking whether the direction of the initial terminal segment 5A of the virtual path TV crosses the threshold 12 of the runway 3.

In the context of the present invention, it is considered that the direction of the initial terminal segment 5A crosses the threshold 12 when the direction of the initial terminal segment 5A (that is to say, the initial terminal segment 5A or the upstream extension of the initial terminal segment 5A) crosses a vertical plane of width equal to the width L of the runway 3 and that passes through the threshold 12 of the runway 3.

The abovementioned condition (the direction of the terminal segment 5A crosses the threshold 12) is therefore met if, laterally, the initial anchor point 7 is offset at most by a distance L/2 from the LTP point.

The computing step E3, implemented by the processing unit 8, comprises adapting the anchor point AP if the abovementioned two conditions, satisfied in the comparison step E1 and in the monitoring step E2, respectively, are met simultaneously:

- the distance D1, D2 is greater than the predetermined distance dAP; and
- the initial terminal segment 5A of the virtual path TV crosses the threshold 12 of the runway 3.

If these two conditions are met, the computing step E3 defines the LTP point as an anchor point AP (instead of the initial anchor point 7).

FIGS. 2 and 3 show two specific examples for illustrating this displacement of the anchor point AP (from the initial anchor point 7 to the LTP point).

In the first example shown in FIG. 2, the projection onto the ground of the initial terminal segment 5A is aligned with the axis 3A of the runway 3.

In this example, the abovementioned conditions are indeed met. On the one hand, the projection of the extension of the initial terminal segment 5A does cross the threshold 12 of the runway 3. On the other hand, the distance D1 between the initial anchor point 7 and the point is much less than the distance dAP.

FIGS. 2 and 3 show, in dashed lines, a circle C having the LTP point as its center and the distance dAP as its radius. All of the points located in this circle C therefore satisfy this last condition.

In this first example, the anchor point AP determined by the avionics computer 1 therefore corresponds to the LTP point and the terminal segment 5 (between the fix FAF and the point AP) is aligned with the initial terminal segment 5A (between the fix FAF and the point 7).

Depending on the position, the initial anchor point may sometimes correspond to a missed approach point (MAP), or MAP point, relative to the runway 3. The MAP point, which is published, corresponds to the limit point at which the pilot must, at the latest, initiate a go-around when the corresponding approach is missed (this, in particular, being the case when the pilot is unable to see the runway 3 before reaching this MAP point). FIGS. 2 and 3 show the MAP point by way of illustration.

Moreover, in the second example shown in FIG. 3, the projection onto the ground of the initial terminal segment 5A has an angle $\alpha$ with respect to the axis 3A of the runway 3.

In this example, the abovementioned conditions are also met. On the one hand, the projection of the extension of the initial terminal segment 5 does cross the threshold 12 of the runway 3. On the other hand, the distance D2 between the initial anchor point 7 and the LTP point is much less than the distance dAP.

In this second example, the anchor point AP determined by the avionics computer 1 therefore also corresponds to the LTP point.

In this case, the terminal segment 5 (of the virtual path TV) followed by the aircraft AC (which ends at this anchor point AP) is parallel to the initial terminal segment 5A connecting the fix FAF to the initial anchor point 7, while being offset (laterally) by a lateral offset DEV.

In this example, the terminal segment 5 of the virtual path TV that is followed by the aircraft AC is thus offset slightly, laterally (that is to say, in the horizontal plane), with respect to the initial terminal segment 5A. This lateral offset DEV is less than or equal to half the width L of the runway 3, otherwise the initial terminal segment 5 would not cross the threshold 12 of the runway 3. This lateral offset DEV is therefore small, generally less than 0.01 NM (around 18.5 meters), and is negligible (in particular, having no negative impact on safety and not preventing implementation thereof).

The terminal segment 5 has the same slope as the initial terminal segment 5A, and it ends at the anchor point AP.

Moreover, as indicated above, the procedure M, which implements FLS mode using the set 2 (of systems), comprises the method P for adapting the anchor point AP as described above, and uses the anchor point AP determined by the method P as an anchor point of the terminal segment 5 of the virtual path TV.

To this end, when FLS mode is active, that is to say, during the approach of the aircraft AC and the landing of the aircraft AC, as far as the touchdown zone 18 of the runway 3, the procedure M implements (using the set 2) various steps or operations specified below.

The procedure M comprises a guidance step (or operation) EA, implemented continuously, comprising guiding the aircraft AC along the terminal segment 5 of the virtual path TV as far as the touchdown zone 18 on the runway 3.

Guiding the aircraft AC comprises canceling out any discrepancies (which are detected continuously) between the current position PC of the aircraft AC, determined as specified below, and the position it would have if it were on the virtual path TV. In the example of FIG. 7, the aircraft AC is offset vertically by an offset PDEz, located below the virtual path TV.

The display system 17 displays these discrepancies (or deviations) on screens that are installed in the cockpit of the aircraft AC.

The display system 17 comprises, for example, the primary flight parameter screen (PDF, primary flight display) 19, shown in FIG. 6, and the navigation screen (ND, navigation display) 20, shown in FIG. 7.

The screen 19 comprises, as is conventional, a flight indicator 22, a heading indicator 23, an altitude indicator 24 and a speed indicator 25.

When implementing FLS mode, the display system 17 displays, in particular, the following information on the screen 19:

- on a zone Z1, an indication ("FLS") informing that FLS mode is active;
- on a zone Z2, the references (not shown) of the anchor point (LTP point) used by FLS mode; and
- on a zone Z3, the "F-G/S" and "F-LOC" modes that are activated, that is to say, respectively for horizontal guidance ("glide") and vertical guidance ("loc") with respect to the virtual path TV.

In one particular embodiment, the terrain avoidance and warning system 13 activates, where applicable, the "F-G/S" and "F-LOC" modes.

The flight indicator 22 indicates that the aircraft AC is located below the virtual path, as in the example of FIG. 5.

In addition, the display system 17 also comprises the navigation screen 20, which comprises, as is conventional and as shown in FIG. 7, a heading indicator 26, a distance indicator 27 and a symbol IAC illustrating the current position of the aircraft.

In the example shown, relating to the situation of FIG. 5, the aircraft AC is correctly positioned laterally. In this case, the symbol IAC that follows the virtual path (illustrated by a symbol ITV) is directed toward the runway (illustrated by a symbol 13).

In one particular embodiment, the current position PC of the aircraft AC, which is used for guidance, is determined by the processing unit 8 of the avionics computer 1 (flight management system). To this end, the processing unit 8, in a conventional manner, consolidates:

on the one hand, raw GNSS (Global Navigation Satellite System) position data, received from the landing assistance multimode receiver 15; and on the other hand, hybridized position data, hybridized from GNSS data and inertial data, received from the air data and inertial reference system 16.

Furthermore, the procedure M also comprises a monitoring step EB, implemented continuously, comprising, during the landing of the aircraft AC, monitoring the aircraft AC as far as the touchdown zone 18 on the runway 3.

This monitoring step EB is capable of detecting, where applicable, a deviation, such as the vertical deviation PDEz of FIG. 5, of the current position PC of the aircraft AC with respect to the terminal segment 5 of the virtual path TV.

Moreover, the procedure M comprises a warning step EC comprising, in the event of detection (in the monitoring step EB) of a vertical deviation and/or of a horizontal deviation that is greater than a predetermined value, emitting one or more warnings in the cockpit of the aircraft.

To warn the pilot of such an excessive deviation situation, the acoustic warning unit 21 emits an acoustic signal in the cockpit of the aircraft AC.

In addition, the display unit 17 outputs, on the screen 19, at least one characteristic symbol 28, preferably in flashing form, so as to warn the pilot of the aircraft of this excessive deviation.

To this end, depending on the envisaged architecture of the set 2, the flight warning system 10 or the flight guidance system 11 provides instructions to the display system 17 so that it produces such a display.

The avionics computer 1 and the method P (and the set 2 and the procedure M that use the anchor point determined by the avionics computer 1 and the method P), as described above, have many advantages. In particular, they have advantages:

in terms of availability, since they make it possible to adapt the anchor point so as to allow FLS mode to be implemented (as far as the touchdown zone on the runway, with its guidance, monitoring and possibly warning operations) for situations that do not currently allow this;

in terms of robustness; and by providing information able to be used, where applicable, in a future automatic landing system for straight and non-offset approaches.

The systems and devices described herein may include a controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adapting an anchor point of a terminal segment of a virtual path for a non-precision Flight Management System (FMS) Landing System (FLS) approach mode of an aircraft, with a view to landing the aircraft on a runway of an aerodrome, the method being implemented in an avionics computer comprising at least a processing unit and a navigation database, wherein the method comprising at least the following steps, implemented by the processing unit of the avionics computer:

comparing a distance between a first position and a second position with a predetermined distance, the first position corresponding to a position of an initial anchor point of an initial terminal segment and the second position corresponding to the position of a landing threshold point of the runway;

checking whether the direction of the terminal segment of the virtual path crosses the landing threshold point of the runway;

computing the landing threshold point of the runway as an anchor point if the distance between the first position and the second position is less than the predetermined distance and if the initial terminal segment of the virtual path crosses the landing threshold of the runway; and executing the FLS approach to land the aircraft on the runway at the anchor point.

2. The method as claimed in claim 1, wherein the avionics computer comprises a flight management system.

3. The method as claimed in claim 1, wherein the predetermined distance is on the order of 0.14 nautical miles.

4. A procedure for implementing a non-precision FLS approach mode of an aircraft, with a view to landing the aircraft on runway of an aerodrome, the procedure using a virtual path comprising a terminal segment that is defined with respect to an anchor point, the procedure being implemented by a set of avionics systems, comprising at least a method for adapting an anchor point as claimed in claim 1, and wherein the procedure uses, where applicable, the anchor point defined by the method as claimed in claim 1 as an anchor point of the terminal segment of the virtual path.

5. The procedure as claimed in claim 4, wherein, during the landing of the aircraft, the procedure guides the aircraft at least along the terminal segment of the virtual path, as far as a touchdown zone on the runway.

6. The procedure as claimed in claim 4, wherein, during the landing of the aircraft, the procedure monitors the aircraft as far as a touchdown zone on the runway, so as to detect, where applicable, at least one deviation of the current position of the aircraft with respect to the terminal segment of the virtual path.

7. The procedure as claimed in claim 6, wherein, in the event of detection of a deviation greater than a predetermined value, the procedure emits at least one of the following warnings in the cockpit of the aircraft: a visual warning, an acoustic warning.

8. An avionics computer for adapting an anchor point of a terminal segment of a virtual path for a non-precision Flight Management System (FMS) Landing System (FLS) approach mode of an aircraft, with a view to landing the aircraft on a runway of an aerodrome, the avionics computer comprising at least a processing unit and a navigation database, wherein the processing unit is configured:

to compare a distance between a first position and a second position with a predetermined distance, the first position corresponding to a position of an initial anchor point of an initial terminal segment and the second position corresponding to a position of a landing threshold point of the runway;

to check whether the initial terminal segment of the virtual path crosses the threshold of the runway;

if the distance between the first position and the second position is less than the predetermined distance and if the initial terminal segment of the virtual path crosses the threshold of the runway, to define the landing threshold point of the runway as an anchor point; and, to execute the FLS approach to land the aircraft on the runway at the anchor point.

9. The avionics computer according to claim 8, wherein the avionics computer comprises a flight management system.

10. A set of avionics systems for implementing a non-precision FLS approach mode of an aircraft, with a view to landing the aircraft on a runway of an aerodrome, the set of avionics systems comprising at least one flight management system configured to use a final virtual path a terminal segment of which is defined with respect to an anchor point, wherein the set of avionics systems comprises at least one avionics computer for adapting an anchor point as claimed in claim 8, and wherein the set of avionics systems is configured to use the anchor point defined by the avionics computer as an anchor point of the terminal segment of the virtual path.

11. The set as claimed in claim 10, wherein the set additionally comprises at least one of the following systems:

a flight warning system, a flight guidance system, a terrain avoidance and warning system, and wherein the set is configured to implement at least one of the following actions during the landing of the aircraft:

guiding the aircraft at least along the terminal segment of the virtual path, as far as a touchdown zone on the runway;

monitoring the aircraft as far as a touchdown zone on the runway, so as to detect, where applicable, a deviation of the current position of the aircraft with respect to the terminal segment of the virtual path;

in the event of detection of a deviation greater than a predetermined value, emitting at least one of the following warnings in the cockpit of the aircraft: a visual warning, an acoustic warning.

12. An aircraft comprising at least one set of avionics systems as claimed in claim 10.

* * * * *